(12) United States Patent
Abe et al.

(10) Patent No.: US 11,041,476 B2
(45) Date of Patent: Jun. 22, 2021

(54) HYDROELECTRIC POWER GENERATION SYSTEM

(71) Applicant: DAIKIN INDUSTRIES, LTD., Osaka (JP)

(72) Inventors: Takahiro Abe, Osaka (JP); Atsushi Suhara, Osaka (JP); Takahiro Yokoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 224 days.

(21) Appl. No.: 16/332,430

(22) PCT Filed: Sep. 11, 2017

(86) PCT No.: PCT/JP2017/032620
§ 371 (c)(1),
(2) Date: Mar. 12, 2019

(87) PCT Pub. No.: WO2018/056088
PCT Pub. Date: Mar. 29, 2018

(65) Prior Publication Data
US 2020/0386202 A1      Dec. 10, 2020

(30) Foreign Application Priority Data

Sep. 20, 2016 (JP) .............................. JP2016-182609

(51) Int. Cl.
*F03B 13/00* (2006.01)
*H02P 9/04* (2006.01)
(Continued)

(52) U.S. Cl.
CPC .............. *F03B 15/08* (2013.01); *F03B 15/16* (2013.01); *H02P 9/04* (2013.01)

(58) Field of Classification Search
CPC ............. F03B 15/08; F03B 15/16; H02P 9/04
See application file for complete search history.

(56) References Cited

U.S. PATENT DOCUMENTS 4,387,575 A * 6/1983 Wenzel ................... F02C 1/04
                                                             60/648
4,496,845 A    1/1985 Ensign et al.
(Continued)

FOREIGN PATENT DOCUMENTS

CN         103646294 A      3/2014
CN         103850299 A      6/2014
(Continued)

OTHER PUBLICATIONS

Extended European Search Report, dated Jan. 21, 2020, for European Application No. 17852865.9.
(Continued)

*Primary Examiner* — Tulsidas C Patel
*Assistant Examiner* — Thomas K Quigley
(74) *Attorney, Agent, or Firm* — Birch, Stewart, Kolasch & Birch, LLP

(57) ABSTRACT

An electric power information acquisition unit is provided for acquiring power supply-and-demand information including electric power acceptable to an electric power system or information correlated with the electric power. A fluid information acquisition unit is provided for acquiring fluid information including information correlated with a physical quantity of a fluid flowing out of a channel. A controller is provided for controlling at least one of the physical quantity, the channel or electric power generated or electric power to be generated by a generator by using the fluid information so that the physical quantity becomes equal to a desired value, while controlling electric power to be supplied to the electric power system to the electric power acceptable to the electric power system or less, by using the power supply-and-demand information.

10 Claims, 9 Drawing Sheets

(51) Int. Cl.
*F03B 15/08* (2006.01)
*F03B 15/16* (2006.01)

(56) References Cited

U.S. PATENT DOCUMENTS

| | | | | |
|---|---|---|---|---|
| 7,632,040 | B2 * | 12/2009 | Cripps | F03B 13/00 |
| | | | | 405/75 |
| 7,768,146 | B2 * | 8/2010 | Balzano | F03B 13/00 |
| | | | | 290/54 |
| 2003/0155773 | A1 | 8/2003 | Wobben | |
| 2007/0041790 | A1 * | 2/2007 | Cripps | F03B 13/00 |
| | | | | 405/75 |
| 2011/0006530 | A1 * | 1/2011 | Van Blerk | E02B 9/00 |
| | | | | 290/52 |
| 2012/0326443 | A1 * | 12/2012 | Vince | F03B 15/00 |
| | | | | 290/7 |
| 2015/0102603 | A1 * | 4/2015 | Schaefer | F03B 15/04 |
| | | | | 290/52 |
| 2015/0260151 | A1 | 9/2015 | Kang | |
| 2016/0248357 | A1 | 8/2016 | Mori et al. | |
| 2017/0314527 | A1 | 11/2017 | Sakamoto et al. | |

FOREIGN PATENT DOCUMENTS

| | | |
|---|---|---|
| CN | 104113246 A | 10/2014 |
| JP | 2003-535561 A | 11/2003 |
| JP | 2014-214710 A | 11/2014 |
| JP | 2016-118207 A | 6/2016 |
| JP | 2016-158335 A | 9/2016 |

OTHER PUBLICATIONS

International Search Report, issued in PCT/JP2017/032620, dated Nov. 28, 2017.
Commission of «Textbooks Series for Vocational Skill Appraisal of Wind Power Generation»; "Wind Turbine Maintenance Workers—Elementary", pp. 9-11.

* cited by examiner

HYDROELECTRIC POWER GENERATION SYSTEM

TECHNICAL FIELD

The present invention relates to a hydroelectric power generation system.

BACKGROUND ART

There is a hydroelectric power generation system that generates power by a fluid (e.g., water) flowing through a water channel (e.g., a penstock). For example, a hydroelectric power generation system disclosed in Patent Document 1 includes a water turbine (fluid machine) connected to a penstock. When the water turbine is rotated by the fluid, a generator connected to the water turbine is driven. The output power of the generator is supplied to an electric power system (e.g., a commercial power supply) by, for example, a reverse power flow.

CITATION LIST

Patent Document

Patent Document 1: Japanese Unexamined Patent Publication No. 2014-214710

SUMMARY OF THE INVENTION

Technical Problem

In the case of reverse power flow of generated electric power, it may be required that the voltage of the commercial power supply be kept within a predetermined range by law or the like. In that case, it is necessary to control the electric power to be reversely flowed so that the voltage of the commercial power supply does not exceed the range.

However, some of hydroelectric power generation systems are configured such that a fluid (e.g., water) must be continuously flowed (e.g., the case of a hydroelectric power generation system installed in a pipe of a waterworks), and a problem arises when the water turbine is simply stopped.

In view of the foregoing problems, it is an object of the present invention to provide a technique of controlling electric power while maintaining a physical quantity of fluid (e.g., a total flow rate) at a desired value.

Solution to the Problem

To achieve the object, a first aspect of the present invention is directed to a hydroelectric power generation system. The hydroelectric power generation system includes: a fluid machine (W) arranged in a channel (1) through which a fluid flows; a generator (G) driven by the fluid machine (W); a controller (20, 30) configured to control at least one of electric power generated or electric power to be generated by the generator (G) and to supply electric power generated by the generator (G) to an electric power system (5); an electric power information acquisition unit (32) configured to acquire power supply-and-demand information including electric power acceptable to the electric power system (5) or information correlated with the electric power; and a fluid information acquisition unit (17, 18) configured to acquire fluid information including information correlated with a physical quantity of the fluid flowing out of the channel (1), wherein the controller (20, 30) controls at least one of the physical quantity, the channel (1), or the electric power generated or the electric power to be generated by the generator (G) by using the fluid information so that the physical quantity becomes equal to a desired value, while controlling electric power to be supplied to the electric power system (5) to the electric power acceptable to the electric power system (5) or less, by using the power supply-and-demand information.

With this configuration, the hydroelectric power generation system is controlled while the electric power of the generator (G) and the physical quantity of fluid are both taken into account.

A second aspect is an embodiment of the first aspect. In the second aspect, the channel (1) is provided with a bypass channel (13) bypassing the fluid machine (W), the physical quantity includes a total flow rate (QT) of the fluid in the channel (1), and the controller (20, 30) controls a flow rate (Q2) of the fluid in the bypass channel (13) so as to cause the total flow rate (QT) to approach a predetermined target total flow rate (QT*).

With this configuration, the total flow rate (QT) is controlled to the target total flow rate (QT*) through the control of the flow rate of the bypass channel (13) and the control of at least one of the electric power generated or the electric power to be generated.

A third aspect is an embodiment of the first or second aspect. In the third aspect, the controller (20, 30) estimates a flow rate (Q1) and an effective head (H) in the fluid machine (W) based on a detectable characteristic that is related to the generator (G) and correlated with the flow rate (Q1) and the effective head (H) in the fluid machine (W), and estimates the total flow rate (QT) based on a flow resistance characteristic line (S) representing a relation between the effective head (H) and the total flow rate (QT) in the channel (1), the flow rate (Q1) which has been estimated, and the effective head (H) which has been estimated.

This configuration, in which the flow rate is estimated based on the flow resistance characteristic line (S), enables the control without using any flowmeter.

A fourth aspect is an embodiment of any one of the first to third aspects. In the fourth aspect, the channel (1) is a pipe, and is provided with a flow rate control valve (15) connected in series to the fluid machine (W) and controlling a flow rate of the fluid flowing into the fluid machine (W), a value of the physical quantity includes a pressure (P2) of the fluid flowing out of the channel (1), and the controller (20, 30) controls a degree of opening of the flow rate control valve (15) so as to cause the pressure (P2) to approach a predetermined target pressure (P*).

With this configuration, the pressure (P2) of the fluid is controlled to the target pressure (P*) through the control of the flow rate control valve (15) and the control of at least one of the electric power generated or the electric power to be generated.

A fifth aspect is an embodiment of any one of the first to fourth aspects. In the fifth aspect, the controller (20, 30) acquires the power supply-and-demand information based on a voltage value (Vac) of a distribution line of the electric power system (5).

With this configuration, electric power acceptable to the electric power system (5) is detected based on the voltage value (Vac).

A sixth aspect is an embodiment of any one of the first to fifth aspects. In the sixth aspect, the hydroelectric power generation system further includes a power consumption unit (40) configured to consume the generated electric power, wherein the controller (20, 30) supplies part or all of the generated electric power to the power consumption unit (40) so that the electric power to be supplied to the electric power system (5) becomes equal to a desired value.

This configurations, in which the electric power to be supplied to the electric power system (5) is adjusted by the power consumption unit (40), makes it possible to easily achieve reduction of electric power by the system interconnection inverter (30) and reduction of at least one of the electric power generated or the electric power to be generated by the generator controller (20) in cooperation with each other if the controllers (20, 30) are configured as a generator controller (20) and a system interconnection inverter (30) as will be described in the following embodiments.

A seventh aspect is an embodiment of any one of the first to sixth aspects. In the seventh aspect, the controller (20, 30) controls a flow rate (Q1) in the fluid machine (W) so that the electric power to be supplied to the electric power system (5) becomes equal to a desired value.

In this configuration, the electric power to be supplied to the electric power system (5) is adjusted through the control of the flow rate (Q1) in the fluid machine (W).

An eighth aspect is an embodiment of the fourth aspect. In the eighth aspect, the controller (20, 30) controls the at least one of electric power generated or electric power to be generated while controlling the degree of opening of the flow rate control valve (15) so that the electric power to be supplied to the electric power system (5) becomes equal to a desired value.

This configuration achieves cooperative control of the degree of opening of the flow rate control valve (15) and the electric power to be supplied to the electric power system (5).

Advantages of the Invention

According to the first aspect, the electric power to be supplied can be controlled while the physical quantity of fluid is maintained at a desired value.

According to the second aspect, the electric power to be supplied can be controlled while the total flow rate of a fluid in a channel is maintained at a desired value.

According to the third aspect, the costs for the hydroelectric power generation system can be reduced.

According to the fourth aspect, the electric power to be supplied can be controlled while a pressure of the fluid flowing out of the channel is maintained at a desired value.

According to the fifth aspect, power supply-and-demand information can be acquired easily.

DESCRIPTION OF EMBODIMENTS

Embodiments of the present invention will be described in detail below with reference to the drawings. The embodiments below are merely exemplary ones in nature, and are not intended to limit the scope, applications, or use of the invention.

First Embodiment

Figure 1:
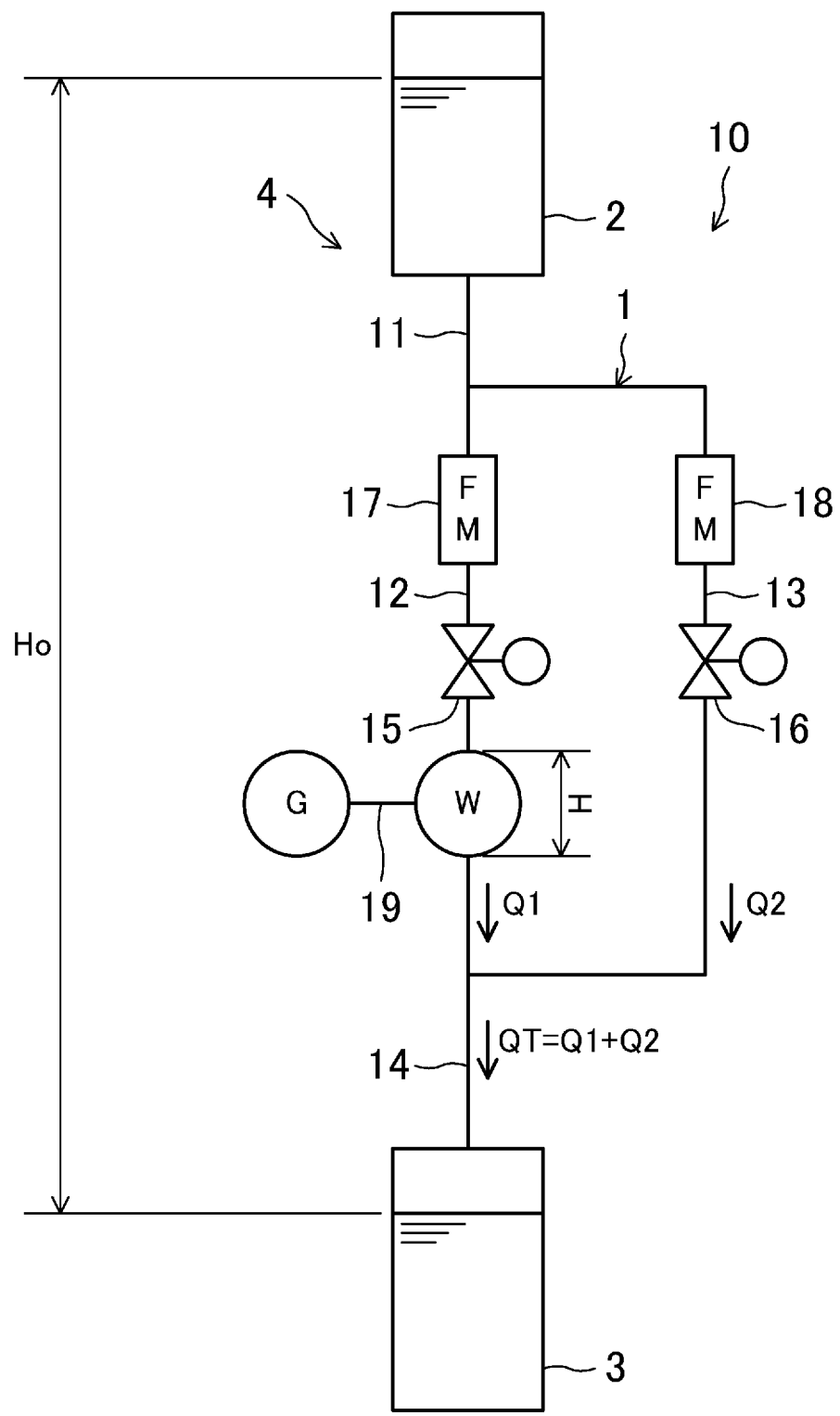
FIG. 1 schematically illustrates an overall configuration of a pipe including a hydroelectric power generation system according to a first embodiment.

FIG. 1 schematically illustrates an overall configuration of a pipe (1) including a hydroelectric power generation system (10) according to a first embodiment of the present invention. The pipe (1) has a head and allows a fluid to flow therethrough. The pipe (1) is an example of the channel of the present invention. In this embodiment, the pipe (1) forms a part of a waterworks (4). The waterworks (4) includes a storage tank (2) and a water receiving tank (3). The pipe (1) of this embodiment is arranged so as to connect the storage tank (2) to the water receiving tank (3) provided downstream of the storage tank (2).

<Hydroelectric Power Generation System (10)>

Figure 2:
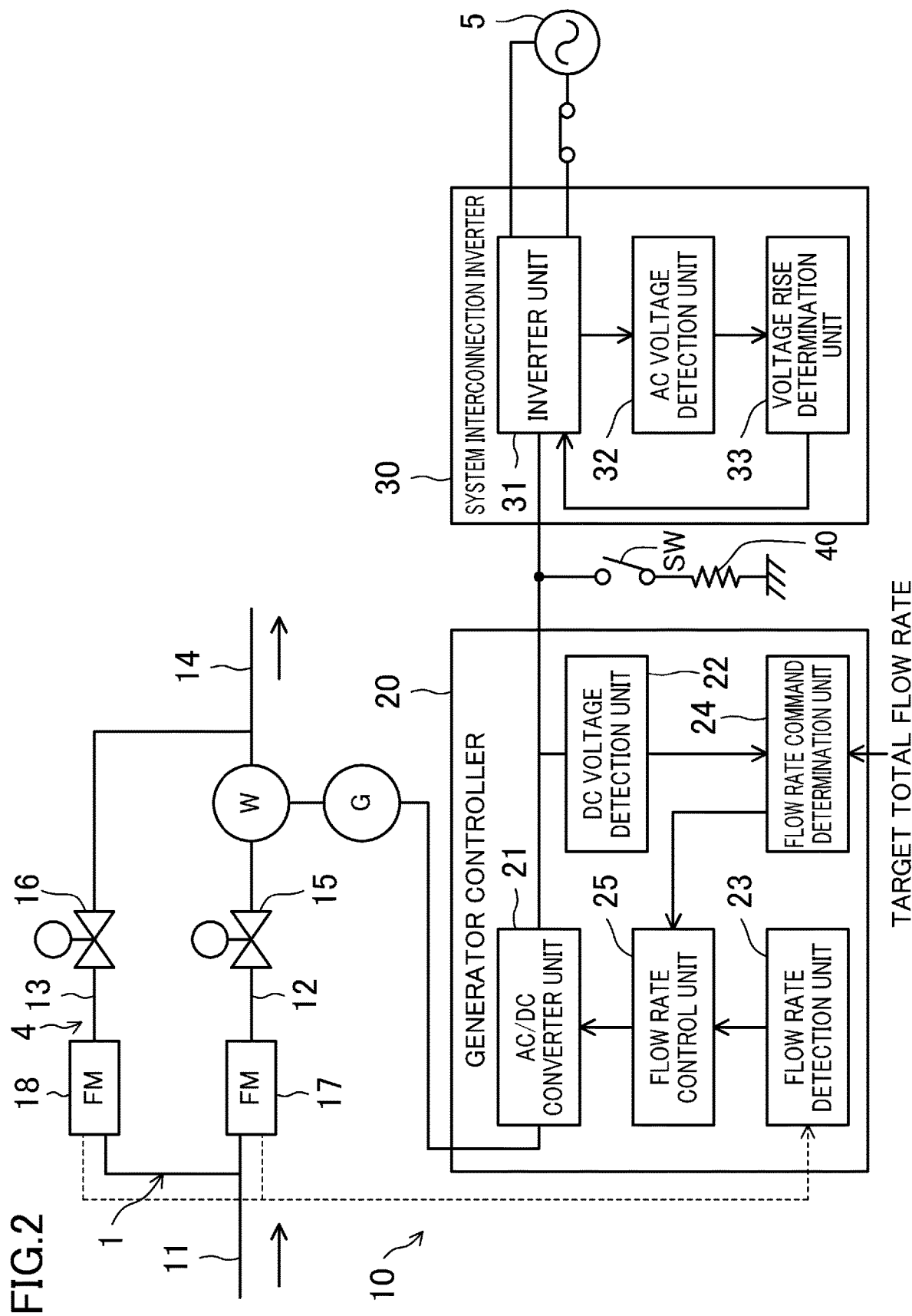
FIG. 2 is a diagram illustrating an electric power system of the hydroelectric power generation system.

As illustrated in FIG. 1, the hydroelectric power generation system (10) includes a water turbine (W) and a generator (G). FIG. 2 is a diagram illustrating an electric power system of the hydroelectric power generation system (10). The hydroelectric power generation system (10) includes a generator controller (20), a system interconnection inverter (30), and a regenerative resistor (40). The hydroelectric power generation system (10) generates electric power and supplies the power to the electric power system (5). In this example, the electric power system (5) is a so-called commercial power supply. The hydroelectric power generation system (10) supplies electric power to the commercial power supply (5) (i.e., performs the so-called reverse power flow), thereby making the so-called electricity sales.

To sell electricity, the hydroelectric power generation system (10) usually controls the generator (G) such that the generator (G) provides a rated output, and supplies electric power to the electric power system (5). This operation is referred to as the normal operation. The rated output as used herein refers to the maximum electric power output that the generator (G) can achieve in the hydroelectric power generation system (10). As will be described in detail later, the hydroelectric power generation system (10) controls at least one of the electric power generated or the electric power to be generated such that an AC voltage value (Vac) of a distribution line of the electric power system (5) is within a predetermined voltage regulation range (Vr). For example, when the AC voltage value (Vac) of the distribution line of the electric power system (5) is likely to exceed the upper limit of the voltage regulation range (Vr), an operation for reducing electric power to be supplied to the electric power system (5) (a reducing operation of at least one of electric power generated or electric power to be generated, which will be described later) is carried out. Further, during both the normal operation and the reducing operation of at least one of electric power generated or electric power to be generated, the hydroelectric power generation system (10) controls the total flow rate (QT) to a predetermined target total flow rate (QT*).

—Water Turbine (W)—

The water turbine (W) is installed in an intermediate portion the pipe (1), and is an example of the hydraulic machine of the present invention. In this example, the water turbine (W) includes an impeller and a casing (none of which is shown). An impeller of a volute pump is used as the impeller of the water turbine. A shaft (19) is fixed to the center of the impeller. The water turbine (W) is configured such that the impeller is rotated by receiving a pressure of a water flow from a fluid inlet (not shown) formed in the casing, and consequently, the shaft (19) is rotated. The fluid that has flowed into the water turbine (W) is discharged through a fluid outlet (not shown) formed in the casing.

—Generator (G)—

The generator (G) is coupled to the shaft (19) of the water turbine (W), and generates electric power when rotationally driven. In this example, the generator (G) includes an interior permanent magnet rotor, and a stator having coils (none of which is shown).

—Piping System—

The pipe (1) is connected to an inflow pipe (11), an outflow pipe (14), a first branch pipe (12), and a second branch pipe (13). The pipe of this embodiment is comprised of a metal pipe (e.g., a ductile cast iron pipe). The inflow pipe (11) has an inflow end connected to the storage tank (2). The outflow pipe (14) has an outflow end connected to the water receiving tank (3). The first branch pipe (12) and the second branch pipe (13) are connected in parallel with each other between the inflow pipe (11) and the outflow pipe (14). The first branch pipe (12) forms a channel which is closer to the water turbine (W), and through which water for driving the water turbine (W) flows. The second branch pipe (13) forms a bypass channel that bypasses the water turbine (W).

A first flowmeter (17), a first motor-operated valve (15), and the water turbine (W) (specifically, the fluid inlet of the water turbine (W)) are connected to the first branch pipe (12) in this order in the flow direction. The fluid outlet of the water turbine (W) is connected to the outflow pipe (14). A second flowmeter (18) and a second motor-operated valve (16) are connected to the second branch pipe (13) in this order in the flow direction.

The first flowmeter (17) and the second flowmeter (18) are electrically operable. The first flowmeter (17) detects a flow rate of water flowing to the water turbine (W) and outputs a detection signal. The second flowmeter (18) detects a flow rate of water flowing through the second branch pipe (13) and outputs a detection signal.

Each of the first motor-operated valve (15) and the second motor-operated valve (16) controls a flow rate of a fluid by driving its valve body with an electric motor. The first motor-operated valve (15) enters a closed state when, e.g., maintenance of the water turbine (W) is performed so as to prevent water from passing through the water turbine (W) that is at rest. The first motor-operated valve (15) is opened at a predetermined degree of opening (e.g., a fixed value) when the hydroelectric power generation system (10) is in operation. The second motor-operated valve (16) controls the flow rate of water flowing through the second branch pipe (13).

Note that the sum of the detected value of the first flowmeter (17) and the detected value of the second flowmeter (18) is the total flow rate (QT) of the fluid flowing out of the pipe (1). The total flow rate (QT) is an example of the "fluid information including information correlated with the physical quantity of the fluid flowing out of a channel" of the present invention. The first flowmeter (17) and the second flowmeter (18) together form an example of a fluid information acquisition unit of the present invention.

—Generator Controller (20)—

The generator controller (20) includes an AC/DC converter unit (21), a DC voltage detection unit (22), a flow rate detection unit (23), a flow rate command determination unit (24), and a flow rate control unit (25). The generator controller (20), together with the system interconnection inverter (30), controls the electric power to be supplied to the electric power system (5) while maintaining the physical quantity of a fluid (in this case, the total flow rate (QT) of the pipe (1)) at a desired value.

The AC/DC converter unit (21) includes a plurality of switching elements, and switches the electric power (AC power) generated by the generator (G) to convert the AC power into DC power. The DC power is smoothed by a smoothing capacitor (not shown) and supplied to the system interconnection inverter (30).

The DC voltage detection unit (22) detects an output voltage of the AC/DC converter unit (21). A detected value (DC voltage (Vdc)) by the DC voltage detection unit (22) is transmitted to the flow rate command determination unit (24). The flow rate detection unit (23) reads the detected values of the first flowmeter (17) and the second flowmeter (18), and transmits the detected values to the flow rate control unit (25) periodically or in response to a request from the flow rate control unit (25).

The flow rate command determination unit (24) includes a microcomputer and a memory device storing a program for operating the microcomputer. The flow rate command determination unit (24) determines, from the target value of the electric power and the target total flow rate (QT*) that is a target value of the total flow rate (QT), a flow rate command value (Q1*) which is a target value of the flow rate (Q1) of the water turbine (W). For this determination, the target value of the electric power is usually a rated output which will be described later. However, in the hydroelectric power generation system (10), the target value is changed depending on the detected value of the DC voltage detection unit (22), as will be described later in detail. The flow rate command value (Q1*) may be created using, for example, a function or a characteristic map (M), the function and the characteristic map (M) which are defined in the program in advance. The characteristic map (M) will be described later.

The flow rate control unit (25) is comprised of a microcomputer and a memory device storing a program for operating the microcomputer. The microcomputer and the memory device may be commonly used as those forming the flow rate command determination unit (24), or may be provided separately. The flow rate control unit (25) controls the electric power to be generated by the generator (G) by controlling the switching in the AC/DC converter unit (21). Specifically, the flow rate control unit (25) controls the electric power to be generated (output voltage) by the generator (G) by performing feed back control in accordance with a difference between the flow rate command value (Q1*) and the current flow rate (Q1).

Further, the flow rate control unit (25) also controls the total flow rate (QT) in the pipe (1). In this example, the flow rate control unit (25) controls the degree of opening of the second motor-operated valve (16) so that a flow having an amount corresponding to a difference between the target value (hereinafter, referred to as "target total flow rate (QT*)") of the total flow rate (QT) of the pipe (1) and the current flow rate (Q1) flows into the second branch pipe (13).

—System Interconnection Inverter (30)—

The system interconnection inverter (30) includes an inverter unit (31), an AC voltage detection unit (32), and voltage rise determination unit (33).

The inverter unit (31) includes a plurality of switching elements, receives a DC power from the generator controller (20), and switches the DC power so as to convert the DC power into AC power. The AC power converted by the inverter unit (31) is supplied (reversely flowed) to the electric power system (5). The inverter unit (31) controls the electric power to be flowed reversely to the electric power system (5) by controlling the switching.

The AC voltage detection unit (32) acquires power supply-and-demand information including electric power acceptable to the electric power system (5) or information correlated with the electric power. In other words, the AC voltage detection unit (32) is an example of the electric power information acquisition unit of the present invention. Specifically, the AC voltage detection unit (32) detects, as the power supply-and-demand information, a voltage value (AC voltage value (Vac)) of the distribution line of the electric power system (5). The AC voltage value (Vac) is transmitted to the voltage rise determination unit (33).

The voltage rise determination unit (33) compares the AC voltage value (Vac) detected by the AC voltage detection unit (32) with a predetermined first threshold (Th1), and outputs the result of the comparison to the inverter unit (31). Note that, for example, the first threshold (Th1) may be determined in consideration of, e.g., legal regulations. For instance, there is an example in which in respect of a commercial power supply (5) supplying an alternating current of 100 V, it is legally stipulated that a voltage in the distribution line should be maintained within a range from 95 V to 107 V, and that if the voltage is likely to exceed the upper limit of the range, an electricity seller is required to reduce power supply (reverse current flow). In this example, the range from 95 V to 107 V corresponds to the voltage regulation range (Vr), and the first threshold (Th1) may be suitably set to a voltage value slightly lower than 107 V, which is the upper limit of the voltage regulation range (Vr).

<Control of Electric Power (AC Voltage) and Flow Rate>

The degree of opening of the first motor-operated valve (15) is fixed when the hydroelectric power generation system (10) is in operation. In contrast, the degree of opening of the second motor-operated valve (16) can be varied by the generator controller (20). In this hydroelectric power generation system (10), when the second motor-operated valve (16) is operated, the operating point of the water turbine (W) is changed. This change of the operating point of the water turbine (W) leads to a change in the flow rate (Q2) of the second branch pipe (13). It is therefore necessary for the hydroelectric power generation system (10) to perform cooperative control of the water turbine (W) and the second motor-operated valve (16), that is, to perform control while taking both the electric power to be generated (the state of the water turbine (W)) and the state of the second motor-operated valve (16) into account.

Figure 3:
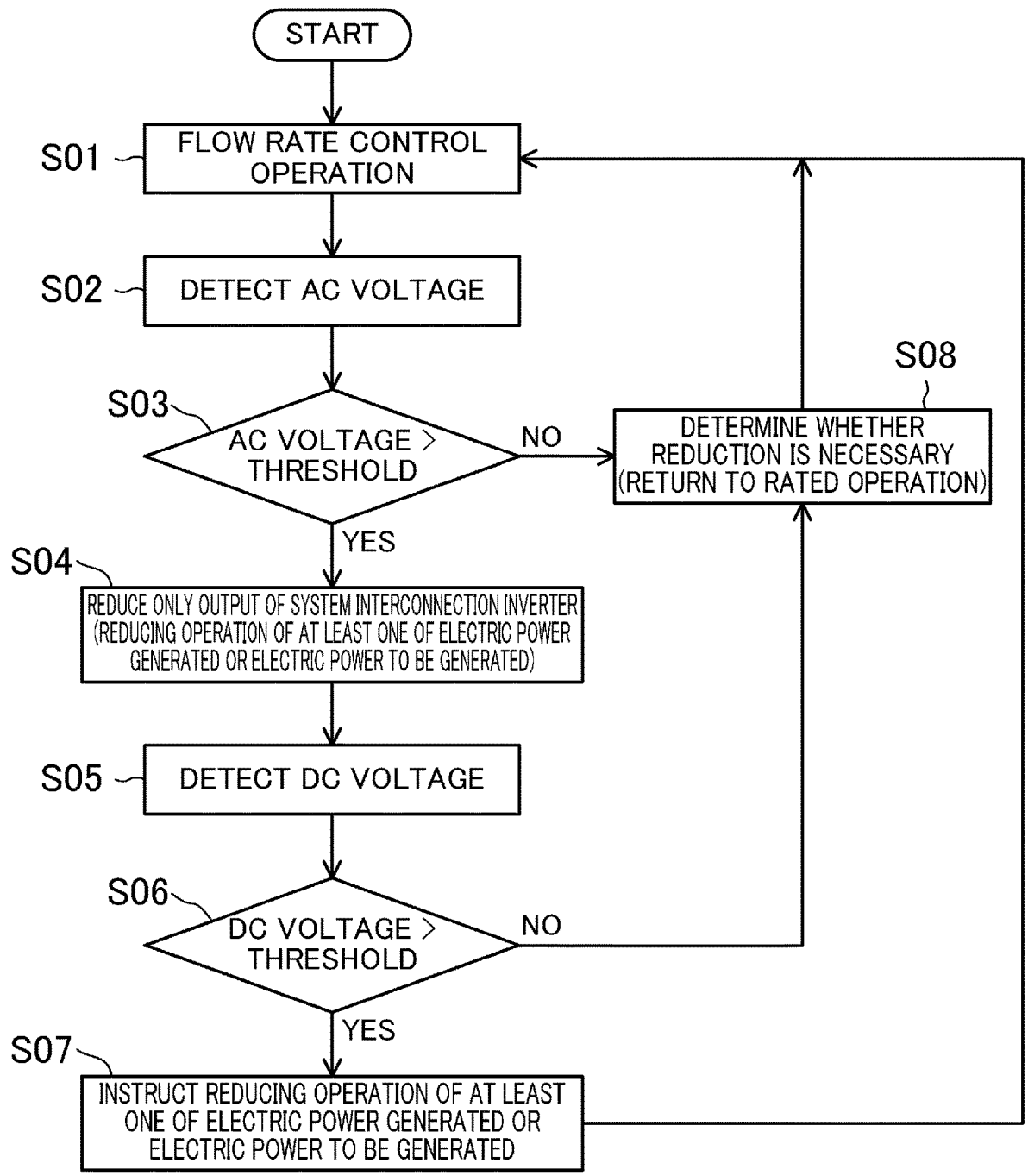
FIG. 3 is a flowchart of control carried out by the hydroelectric power generation system.

FIG. 3 is a flowchart of control of electric power and flow rate carried out by the hydroelectric power generation system (10). In Step (S01) shown in the flowchart, the flow rate control unit (25) controls the switching of the AC/DC converter unit (21) so that the electric power to be generated by the generator (G) becomes equal to the target value, and controls the degree of opening of the second motor-operated valve (16) so that the total flow rate (QT) of the pipe (1) becomes equal to the target total flow rate (QT*). Specifically, in this embodiment, in a state in which the degree of opening of the first motor-operated valve (15) is set to a fixed value, the flow rate control unit (25) controls the switching of the AC/DC converter unit (21) by, for example, feed back control such that the flow rate (Q1) of the water turbine (W) becomes equal to the flow rate command value (Q1*). Thus, the output of the generator (G) converges to the target value of the electric power to be generated.

Then, when the target total flow rate (QT*) differs from the current total flow rate (QT) in this power generation state, the flow rate control unit (25) adjusts the degree of opening of the second motor-operated valve (16). At this time, the flow rate control unit (25) adjusts the degree of opening the second motor-operated valve (16) while comparing the detected value of the second flowmeter (18) transmitted from the flow rate detection unit (23) with the target value of the flow rate (Q2) (i.e., the difference between the target total flow rate (QT*) and the flow rate (Q1)). This adjustment of the degree of opening can be performed through, for example, feed back control. Note that setting of the target total flow rate (QT*) is not limited. For example, it is conceivable to set the target total flow rate (QT*) to a total flow rate required by the administrator of the waterworks (4). The target total flow rate (QT*) may be a fixed value or may be varied, for example, according to time zones.

In Step (S02), the AC voltage detection unit (32) detects a AC voltage value (Vac). In other words, in this embodiment, the power supply-and-demand information is acquired based on the AC voltage value (Vac) of the distribution line. In Step (S03), the voltage rise determination unit (33) compares the AC voltage value (Vac) with the first threshold (ml). The result of the comparison by the voltage rise determination unit (33) is output to the inverter unit (31).

If the result of the comparison in Step (S03) indicates that the AC voltage value (Vac) is larger than the first threshold (Th1), the inverter unit (31) performs the process of Step (S04). In this step (S04), the inverter unit (31) controls the switching to reduce the electric power (voltage) to be flowed reversely, and turns on a switch (SW) connected to the regenerative resistor (40). This causes the regenerative resistor (40) to consume part or all of the DC power output from the AC/DC converter unit (21). This operation is referred to as the "reducing operation of at least one of electric power generated or electric power to be generated." In other words, the regenerative resistor (40) is an example of the power consumption unit of the present invention.

On the other hand, in Step (S05), the DC voltage detection unit (22) detects a DC voltage (Vdc) of the AC/DC converter unit (21). In Step (S06), the flow rate command determination unit (24) compares the DC voltage (Vdc) with a predetermined second threshold (Th2). When the electric power (voltage) to be flowed reversely is reduced in Step (S04), the DC voltage (Vdc) may increase. If the result of comparison by the flow rate command determination unit (24) indicates that the DC voltage (Vdc) is larger than the second threshold (Th2), the process proceeds to Step (S07). In Step (S07), the flow rate command determination unit (24) changes the target value (reduces the target value) of the generated power, and changes the flow rate command value (Q1*) (reduces the target value) based on the changed target value of the electric power to be generated. The flow rate command determination unit (24) instructs the flow rate control unit (25) to perform the reducing operation of at least one of electric power generated or electric power to be generated.

When Step (S07) is completed, the process in the generator controller (20) proceeds to Step (S01). In this case, Step (S01) may be considered as a part of the reducing operation of at least one of electric power generated or electric power to be generated. In Step (S01), as described previously, the switching of the AC/DC converter unit (21) is controlled based on the flow rate command value (Q1*).

When the process proceeds from Step (S07) to Step (S01), the flow rate command value (Q1*) has been changed, and the flow rate (Q1) of the water turbine (W) decreases. As a result, the electric power generated or to be generated by the generator (G) decreases, and the voltage of the distribution line falls within the voltage regulation range (Vr). On the other hand, the degree of opening of the second motor-operated valve (16) is controlled by the flow rate control unit (25), and the total flow rate (QT) of the pipe (1) converges to the target total flow rate (QT*). That is, this embodiment makes it possible to maintain the total flow rate (QT) at the target total flow rate (QT*) while controlling the electric power (voltage of the distribution line) to be flowed reversely to a desired value.

As can be seen, after the output power of the AC/DC converter unit (21) is reduced, the switch (SW) is turned off, and the regenerative resistor (40) is caused to stop consuming the electric power. Note that the regenerative resistor (40) absorbs electric power during a period from the start of a power reduction operation by the inverter unit (31) until the start of a power reduction operation by the AC/DC converter unit (21), and the capacity of the regenerative resistor (40) needs to be set so as to be able to absorb extra electric power in this period of time.

If the result of comparison in Step (S03) indicates that the AC voltage value (Vac) is equal to or smaller than the first threshold (Th1), or if the result of comparison in Step (S06) indicates that the DC voltage (Vdc) is equal to or smaller than the second threshold (Th2), the process proceeds to Step (S08). In Step (S08), if the reducing operation of at least one of electric power generated or electric power to be generated is being carried out currently, the switch (SW) is turned off, and the regenerative resistor (40) is caused to stop consuming the electric power. In addition, the flow rate command determination unit (24) corrects the flow rate command value (Q1*) so as to return the reduced electric power to the original level. Specifically, the flow rate command determination unit (24) makes the flow rate command value (Q1*) return to the original value (a value at the time of the rated output) so that the generator (G) provides the rated output. In response to this, the flow rate control unit (25) controls the AC/DC converter unit (21) (Step (S01)). In addition, the inverter unit (31) also performs switching according to the rated output of the generator (G), so that the inverter unit (31) provides a rated output (Step (S01)). In this manner, the normal operation is performed.

In the example described above, Step (S04) is followed by Step (S05) and the subsequent processing. However, processing from Step (S02) to Step (S04) (i.e., processing performed mainly by the system interconnection inverter (30)) and processing from Step (S05) to Step (S07) (processing performed mainly by the generator controller (20)) may be performed in parallel.

Advantages of Embodiment

As described above, the hydroelectric power generation system (10) of this embodiment makes it possible to control electric power (the voltage of the distribution line) while maintaining the physical quantity of fluid (in this case, the total flow rate (QT)) at a desired value.

Variation of First Embodiment

Figure 4:
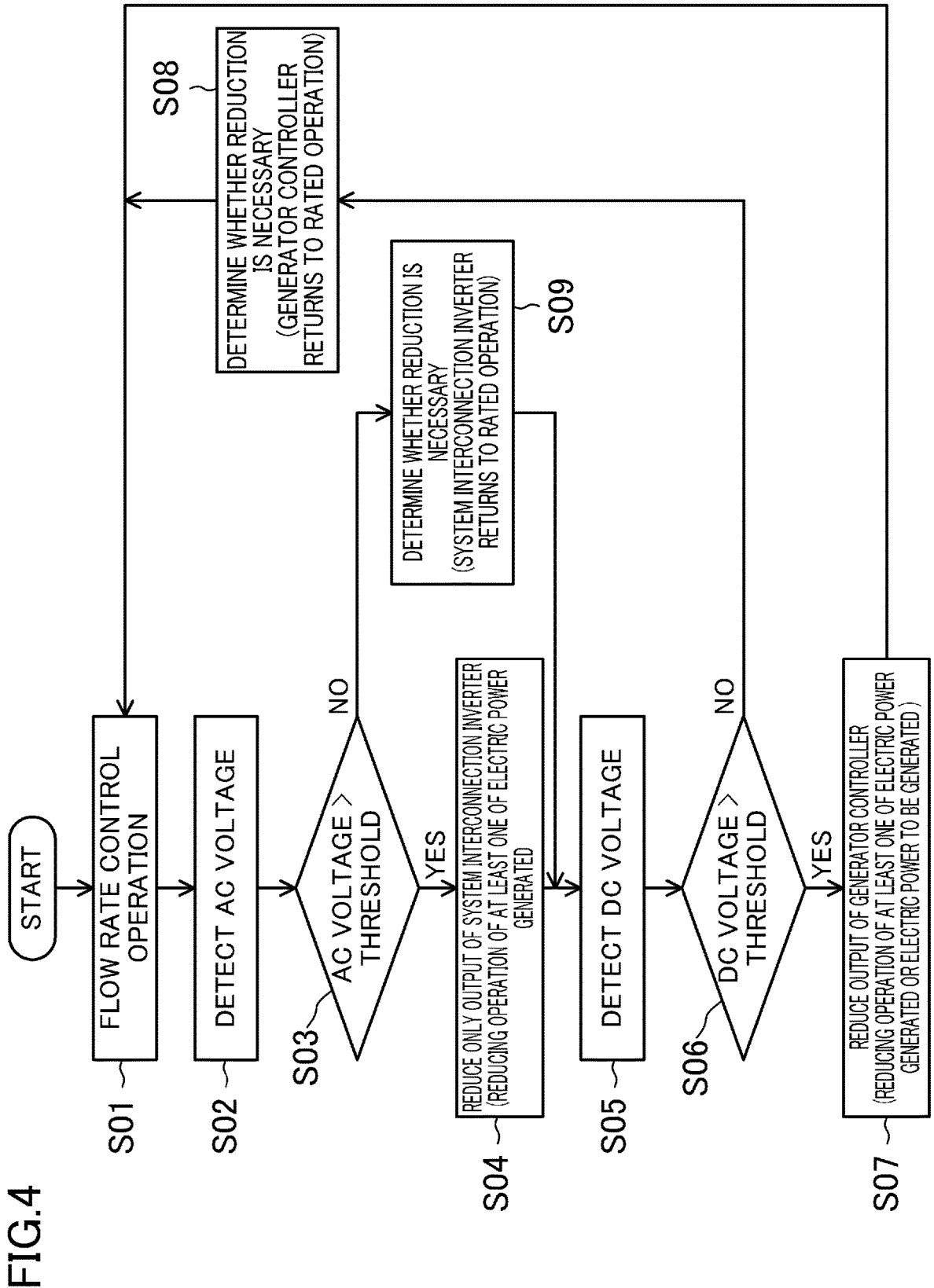
FIG. 4 is a flowchart of control carried out by a hydroelectric power generation system according to a variation of the first embodiment.

In the hydroelectric power generation system (10), the control of the electric power (AC voltage) and the flow rate may be performed using the flowchart shown in FIG. 4. Also in this variation, the degree of opening of the first motor-operated valve (15) is fixed when the hydroelectric power generation system (10) is in operation. The degree of opening of the second motor-operated valve (16) is varied by the generator controller (20).

In Step (S01) shown in the flowchart of FIG. 4, the flow rate control unit (25) controls the switching of the AC/DC converter unit (21) so that the electric power to be generated by the generator (G) becomes equal to the target value, and controls the degree of opening of the second motor-operated valve (16) so that the total flow rate (QT) of the pipe (1) becomes equal to the target total flow rate (QT*). Specifically, in this embodiment, in a state in which the degree of opening of the first motor-operated valve (15) is set to a fixed value, the flow rate control unit (25) controls the switching of the AC/DC converter unit (21) by, for example, feed back control such that the flow rate (Q1) of the water turbine (W) becomes equal to the flow rate command value (Q1*). Thus, the output of the generator (G) converges to the electric power to be generated.

Then, when the target total flow rate (QT*) differs from the current total flow rate (QT) in this power generation state, the flow rate control unit (25) adjusts the degree of opening of the second motor-operated valve (16). At this time, the flow rate control unit (25) adjusts the degree of opening the second motor-operated valve (16) while comparing the detected value of the second flowmeter (18) transmitted from the flow rate detection unit (23) with the target value of the flow rate (Q2) (i.e., the difference between the target total flow rate (QT*) and the flow rate (Q1)). This adjustment of the degree of opening can be performed through, for example, feed back control. Note that setting of the target total flow rate (QT*) is not limited. For example, it is conceivable to set the target total flow rate (QT*) to a total flow rate required by the administrator of the waterworks (4). The target total flow rate (QT*) may be a fixed value or may be varied, for example, according to time zones.

In Step (S02), the AC voltage detection unit (32) detects a AC voltage value (Vac). In other words, in this embodiment, the power supply-and-demand information is acquired based on the AC voltage value (Vac) of the distribution line. In Step (S03), the voltage rise determination unit (33) compares the AC voltage value (Vac) with the first threshold (Th1). The result of the comparison by the voltage rise determination unit (33) is output to the inverter unit (31).

If the result of the comparison in Step (S03) indicates that the AC voltage value (Vac) is larger than the first threshold (Th1), the inverter unit (31) performs the process of Step (S04). In this step (S04), the inverter unit (31) controls the switching to reduce the electric power (voltage) to be flowed reversely. This operation is referred to as the "reducing operation of at least one of electric power generated or electric power to be generated".

On the other hand, in Step (S05), the DC voltage detection unit (22) detects a DC voltage (Vdc) of the AC/DC converter unit (21). In Step (S06), the flow rate command determination unit (24) compares the DC voltage (Vdc) with a predetermined second threshold (Th2). When the electric power (voltage) to be flowed reversely is reduced in Step (S04), the DC voltage (Vdc) may increase. If the result of comparison by the flow rate command determination unit (24) indicates that the DC voltage (Vdc) is larger than the second threshold (Th2), the process proceeds to Step (S07). In Step (S07) of this variation, turning on the switch (SW) connected to the regenerative resistor (40) causes a part or all of the DC power output from the AC/DC converter unit (21) to be consumed by the regenerative resistor (40). In Step (S07), the flow rate command determination unit (24) changes the target value (reduces the target value) of the electric power to be generated, and changes (reduces the target value) the flow rate command value (Q1*) based on the changed target value of the generated power. The flow rate command determination unit (24) instructs the flow rate control unit (25) to perform the reducing operation of at least one of electric power generated or electric power to be generated.

When Step (S07) is completed, the process in the generator controller (20) proceeds to Step (S01). In this case, Step (S01) may be considered as a part of the reducing operation of at least one of electric power generated or electric power to be generated. In Step (S01), as described previously, the switching of the AC/DC converter unit (21) is controlled based on the flow rate command value (Q1*).

When the process proceeds from Step (S07) to Step (S01), the flow rate command value (Q1*) has been changed, and the flow rate (Q1) of the water turbine (W) decreases. As a result, the electric power generated or to be generated by the generator (G) decreases, and the voltage of the distribution line falls within the voltage regulation range (Vr). On the other hand, the degree of opening of the second motor-operated valve (16) is controlled by the flow rate control unit (25), and the total flow rate (QT) of the pipe (1) converges to the target total flow rate (QT*). That is, this embodiment makes it possible to maintain the total flow rate (QT) at the target total flow rate (QT*) while controlling the electric power (voltage of the distribution line) to be flowed reversely to a desired value.

If the result of the comparison in Step (S06) indicates that the DC voltage (Vdc) is equal to or smaller than the second threshold (Th2), the process proceeds to Step (S08). In Step (S08), the switch (SW) is turned off, and the regenerative resistor (40) is caused to stop consuming the electric power. The regenerative resistor (40) absorbs electric power during a period in which the DC voltage (Vdc) is larger than the second threshold (Th2), and the regenerative resistor (40) needs to have a capacity for absorbing the extra power in the period of time.

In Step (S08), if the reducing operation of at least one of electric power generated or electric power to be generated is being carried out currently, the flow rate command determination unit (24) corrects the flow rate command value (Q1*) so as to make the reduced power return to the original level. Specifically, the flow rate command determination unit (24) makes the flow rate command value (Q1*) return to the original value (a value at the time of the rated output) so that the generator (G) provides the rated output. In response to this, the flow rate control unit (25) controls the AC/DC converter unit (21) (Step (S01)). In addition, the inverter unit (31) also performs switching according to the rated output of the generator (G), so that the inverter unit (31) provides a rated output (Step (S01)). In this manner, the normal operation is performed.

If the result of the comparison in Step (S03) indicates that the AC voltage value (Vac) is equal to or smaller than the first threshold (Th1), the process proceeds to Step (S09). In Step (S09), if the system interconnection inverter (30) is currently performing the reducing operation of at least one of electric power generated or electric power to be generated, the system interconnection inverter (30) is returned to a rated operation, and then the process proceeds to Step (S05).

<Advantages of Variation>

As described above, the hydroelectric power generation system (10) of this variation also makes it possible to control electric power (the voltage of the distribution line) while maintaining the physical quantity of fluid (in this case, the total flow rate (QT)) at a desired value.

Second Embodiment

In a second embodiment of the present invention, a different examples of the reducing operation of at least one of electric power generated or electric power to be generated will be described. This embodiment differs from the first embodiment in the configurations of the generator controller (20) and the system interconnection inverter (30). In addition, in this example, neither regenerative resistor (40) nor the switch (SW) is provided. The description below will focus mainly on the differences between this embodiment and the first embodiment.

—Generator Controller (20)—

Figure 5:
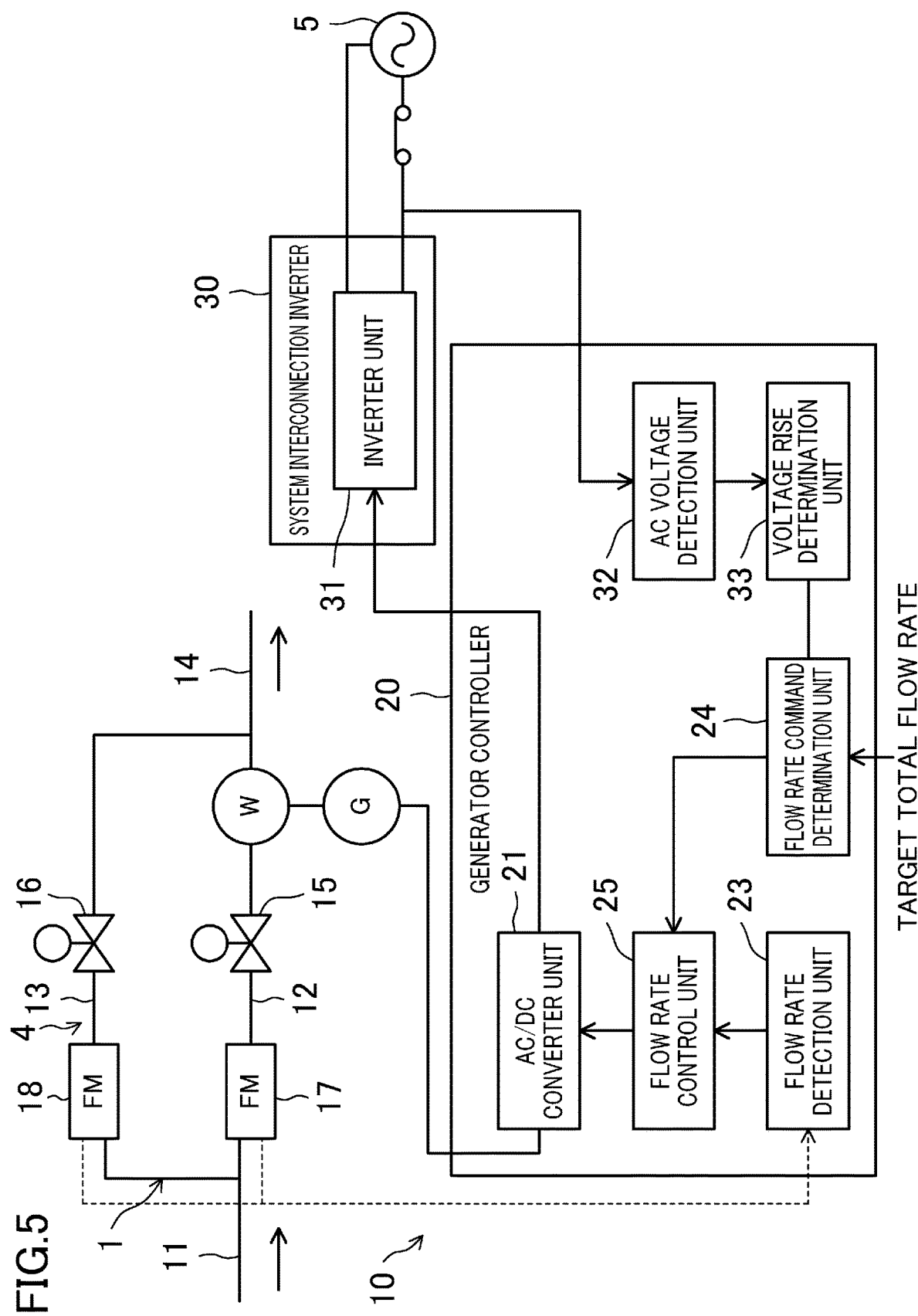
FIG. 5 is a block diagram of a generator controller and a system interconnection inverter according to a second embodiment.

FIG. 5 is a block diagram illustrating the generator controller (20) and the system interconnection inverter (30) according to the second embodiment of the present invention. As illustrated in FIG. 5, the generator controller (20) includes an AC/DC converter unit (21), a flow rate detection unit (23), a flow rate command determination unit (24), a flow rate control unit (25), an AC voltage detection unit (32), and a voltage rise determination unit (33). That is to say, the generator controller (20) of this embodiment includes the AC voltage detection unit (32) and the voltage rise determination unit (33), which are included in the system interconnection inverter (30) in the first embodiment.

As a consequence of this change, the result of comparison by the voltage rise determination unit (33) is transmitted to the flow rate command determination unit (24). The flow rate command determination unit (24) creates a new flow rate command value (Q1*) in accordance with the comparison result transmitted from the voltage rise determination unit (33). The flow rate command value (Q1*) may be created using, for example, a function or a characteristic map (M), the function and the characteristic map (M) defined in the program in advance. The characteristic map (M) will be described later. The functions of the other components forming the generator controller (20) are the same as those of the first embodiment.

<System Interconnection Inverter (30)>

As illustrated in FIG. 5, the system interconnection inverter (30) includes an inverter unit (31). The inverter unit (31) has the same configuration as that of the first embodiment.

<Control of Electric Power (AC Voltage) and Flow Rate>

Figure 6:
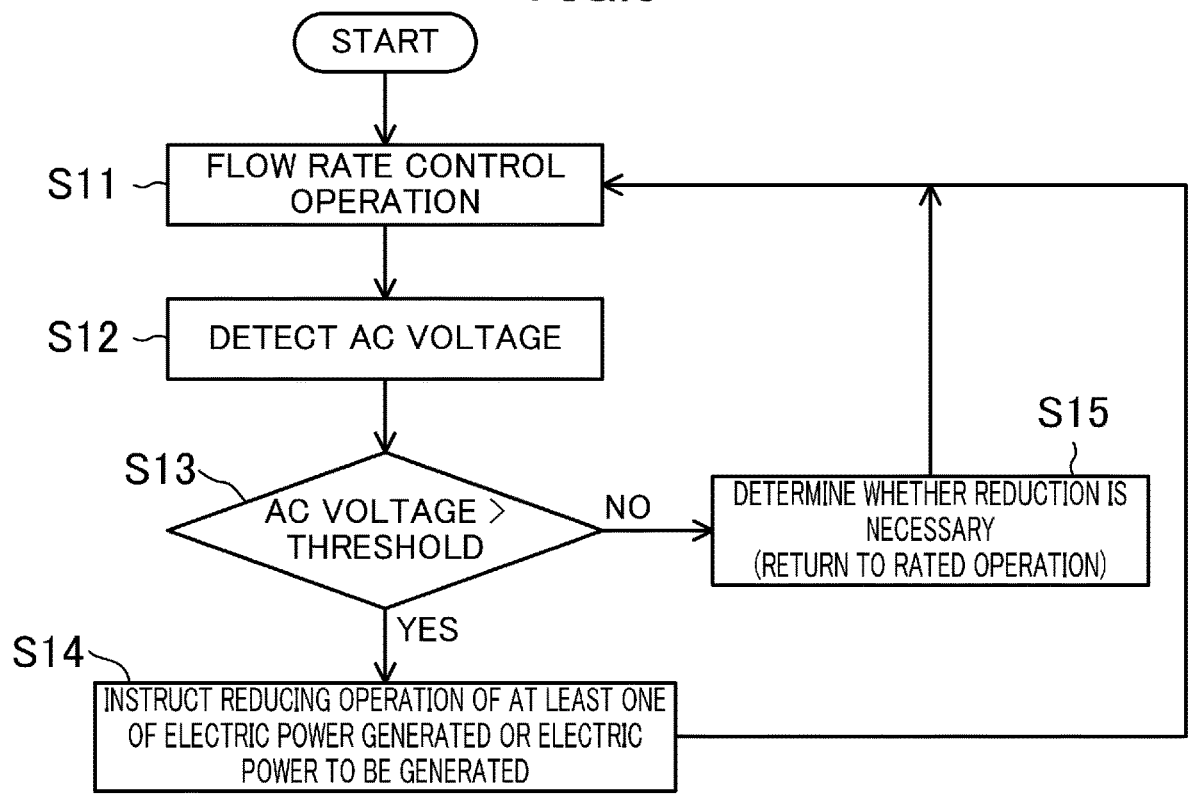
FIG. 6 is a flowchart of control carried out by a hydroelectric power generation system according to the second embodiment.

FIG. 6 is a flowchart of control of the electric power and the flow rate carried out by the hydroelectric power generation system (10) according to the second embodiment. In Step (S11) shown in this flowchart, the flow rate control unit (25) controls the switching of the AC/DC converter unit (21) so that the electric power to be generated by the generator (G) becomes equal to the target value, and controls the degree of opening of the second motor-operated valve (16) so that the total flow rate (QT) of the pipe (1) becomes equal to the target total flow rate (QT*). In other words, the control in Step (S11) is the same as that in Step (S01) of the first embodiment.

In Step (S12), the AC voltage detection unit (32) detects a AC voltage value (Vac). Thus, in this embodiment, the generator controller (20) detects the AC voltage value (Vac). In Step (S13), the voltage rise determination unit (33) compares the AC voltage value (Vac) with the first threshold (Th1). The result of the comparison by the voltage rise determination unit (33) is output to the flow rate command determination unit (24).

If the result of the comparison in Step (S13) indicates that, if the AC voltage value (Vac) is larger than the first threshold (Th1), the process proceeds to Step (S14). In this step (S14), the flow rate control unit (25) controls the switching of the AC/DC converter unit (21) to reduce the electric power (voltage) to be flowed reversely. This operation is referred to as the "reducing operation of at least one of electric power generated or electric power to be generated". Specifically, in Step (S14), the flow rate command determination unit (24) creates a new flow rate command value (Q1*) in accordance with a difference between the AC voltage value (Vac) and the target value thereof, and transmits the new flow rate command value (Q1*) to the flow rate control unit (25). In this case, the flow rate command value (Q1*) will be reduced. The same method as in the first embodiment can be employed for creating the flow rate command value (Q1*).

When Step (S14) is completed, the process of the generator controller (20) proceeds to Step (S11). In this case, Step (S11) may be considered as a part of the reducing operation of at least one of electric power generated or electric power to be generated. In Step (S11), as described previously, the switching of the AC/DC converter unit (21) is controlled based on the flow rate command value (Q1*). When the process proceeds from Step (S14) to Step (S11), the flow rate command value (Q1*) has been changed, and a torque vale (T) and a rotational speed (N) of the water turbine (W) are varied to make the flow rate (Q1) decrease. As a result, the electric power generated or to be generated by the generator (G) decreases, and the voltage of the distribution line falls within the voltage regulation range (Vr). On the other hand, the degree of opening of the second motor-operated valve (16) is controlled by the flow rate control unit (25), and the total flow rate (QT) of the pipe (1) converges to the target total flow rate (QT*). That is, this embodiment makes it possible to maintain the total flow rate (QT) at the target total flow rate (QT*) while controlling the electric power (voltage of the distribution line) to be flowed reversely to a desired value.

If the result of the comparison in Step (S13) indicates that the AC voltage value (Vac) is equal to or smaller than the first threshold (Th1), the process proceeds to Step (S15). The processing in Step (S15) is the same as that in Step (S08) of the first embodiment. The flow rate command determination unit (24) corrects the flow rate command value (Q1*) so as to return the reduced power to the original level. Specifically, the flow rate command determination unit (24) makes the flow rate command value (Q1*) return to the original value (a value at the time of the rated output) so that the generator (G) provides the rated output. In response to this, the flow rate control unit (25) controls the AC/DC converter unit (21). In addition, the inverter unit (31) also performs switching according to the rated output of the generator (G), so that the inverter unit (31) provides the rated output.

Advantages of Embodiment

As described above, the hydroelectric power generation system (10) of this embodiment also makes it possible to control electric power (the voltage of the distribution line) while maintaining the physical quantity of fluid (in this case, the total flow rate (QT)) at a desired value.

Further, in this embodiment, when the electric power is needed to be reduced, the output of the AC/DC converter unit (21) is reduced before reduction of the electric power of the inverter unit (31). This feature eliminates the need for the regenerative resistor (40), and thus reduces the size of the hydroelectric power generation system (10).

Third Embodiment

In a third embodiment of the present invention, an examples of the control in which neither the first flowmeter (17) nor the second flowmeter (18) are used. In order to perform this control, the memory device of the flow rate control unit (25) of this embodiment stores a characteristic map (M) (see FIG. 7). This characteristic map (M) is an H-Q map whose vertical axis represents an effective head (H) of a pipe (1) and whose horizontal axis represents a flow rate (i.e., the total flow rate (QT)) of a fluid flowing out of the pipe (1). On the characteristic map (M), characteristics which can be detected in the generator (G) and which correlate with the flow rate (Q1) of the water turbine (W) and the effective head (H) are recorded. In this example, a characteristic correlating with the flow rate (Q1) and the effective head (H) include a torque value (T), a rotational speed (N), and a generated electric power (P) of the generator (G). More specifically, the characteristic map (M) of this embodiment is the H-Q map on which a plurality of equal torque curves and a plurality of equal rotational speed curves are recorded. The characteristic map (M) is stored in a memory device forming the flow rate control unit (25), in the form of a table (number table) and a mathematical expression (function) in a program.

In the characteristic map (M), a region between an unrestrained speed curve in the case where no load is applied to the generator (G) and the torque value is zero (T=0) and an equal rotational speed curve in the case where the rotational speed value is zero (N=0) is a water turbine region (operable region) in which the water turbine (W) is rotated by water flow. Here, the equal rotational speed curve at the time when N=0 is referred to as an operation limit curve. The generator (G) basically operates when rotationally driven by the water turbine (W) within the water turbine region. The region on the left of the unrestrained speed curve is a water turbine brake region (power running region).

In the water turbine region, the plurality of equal torque curves extend along the unconstrained speed curve (T=0), and the torque value also increases in accordance with an increase in the flow rate (Q1) on the map. The plurality of equal rotational speed curves extend along the equal rotational speed curve in the case where the rotational speed value is zero (N=0), and the rotational speed increases with an increase in the effective head (H). Furthermore, the equal generated power curves indicated by the broken lines are downward convex, and the generated power also increases with an increase in the effective head (H) and the flow rate (Q1). A curve (E) connecting the apexes of the plurality of equal generated power curves together is a maximum generated electric power curve along which the generator (G) obtains the maximum generated electric power. The characteristic map (M), i.e., the H-Q map on which the torque value (T), the rotational speed (N), and the generated power (P) of the generator (G) are recorded, is independent of the pipe (1) to which the hydroelectric power generation system (10) is connected, and is unique to the hydroelectric power generation system (10).

A system loss curve (S), of the pipe (1), which has been measured in an actual operation is then recorded on the characteristic map (M). The system loss curve (S) is also stored in the memory device forming the flow rate control unit (25), in the form of a table (number table) and a mathematical expression (function) in a program.

The system loss curve (S) is a flow resistance characteristic line which is unique to the pipe (1) shown in FIG. 1. The effective head (H) at the time when the total flow rate (QT) is zero is a total head (Ho). The effective head (H) deceases in the form of a quadratic curve in accordance with an increase in the total flow rate (QT), and the curvature thereof has a value unique to the pipe (1) shown in FIG. 1. The total flow rate (QT) in the pipe (1) including the hydroelectric power generation system (10) and the effective head (H) in this case correspond to a point on the system loss curve (S). For example, if the second motor-operated valve (16) is fully closed and water is supplied only to the water turbine (W), the flow rate in the water turbine (W) corresponds to the total flow rate (QT) of the pipe (1) including the hydroelectric power generation system (10), and the point corresponding to the flow rate (Q1) and the effective head (H) of the water turbine (W) at that time is on the system loss curve (S). In other words, the operating point of the water turbine (W) is on the system loss curve (S).

If a fluid (water) is supplied to both the water turbine (W) and the second branch pipe (13), the total value of the flow rate in the water turbine (W) and the flow rate in the second branch pipe (13) corresponds to the total flow rate (QT) of the pipe (1) including the hydroelectric power generation system (10). The total flow rate (QT) and the effective head (H) at that time correspond to a point on the system loss curve (S), whereas the operating point of the water turbine (W) is not on the system loss curve (S).

For example, if the rotational speed (N) of the generator (G) and the current torque value (T) are known, the operating point of the water turbine (W) can be found by using the characteristic map (M), so that the current flow rate (Q1) in the water turbine (W) can be found. It becomes accordingly possible to know the total flow rate (QT) and the flow rate (Q2) of the second branch pipe (13).

Figure 7:
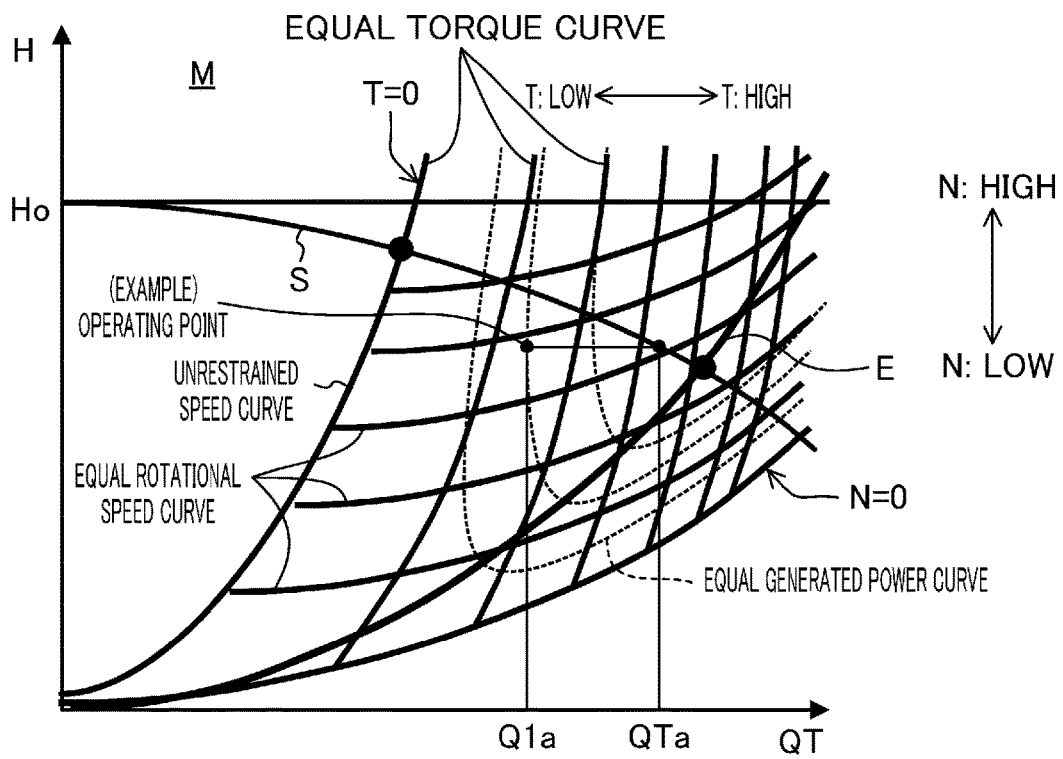
FIG. 7 shows a characteristic map of a fluid system.

This approach is now specifically described with reference to FIG. 7. The current operating point is the intersection of an equal rotational speed curve corresponding to the current rotational speed (N) and an equal torque curve corresponding to the current torque value (T). A flow rate (Q1a) that is a value indicated by a scale mark, on the horizontal axis, corresponding to the operating point is the flow rate (Q1) of the water turbine (W). An intersection point of a line passing through an operating point and being parallel to the horizontal axis and the system loss curve (S) is obtained. A flow rate (QTa) that is a value indicated by a scale mark, on the horizontal axis, corresponding to the intersection point is a total flow rate (QT) at that time. Then, the flow rate (Q2) of the second branch pipe (13) at that time is given by the expression: QTa−Q1a.

Once the target value of the electric power to be generated is determined, the operating point of the water turbine (W) can be determined by using the characteristic map (M). Accordingly, as described previously, a flow rate of fluid to be supplied to the water turbine (W) can be determined, and the value of this flow rate can be used as the flow rate command value (Q1*). For example, the intersection of a line that passes through a point on the system loss curve (S) corresponding to the current total flow rate (QT) (referred to as the flow rate (QTa)) and is parallel to the horizontal axis and an equal generated power line corresponding to the target value of the electric power to be generated corresponds to a target operation point (see FIG. 7). Once the target operating point is determined, the flow rate (Q1a), which is a value indicated by a scale, on the horizontal axis, corresponding to the target operating point corresponds to a flow rate command value (Q1*) for obtaining the target value of the electric power to be generated.

Note that, since the effective head (H) and the pressure difference between an upstream side and a downstream side of the water turbine (W) are in a proportional relationship, a system loss curve in which a pressure difference (effective pressure difference) between the upstream and downstream sides of the water turbine (W) is taken as a vertical axis is equivalent to a system loss curve (S) in which the effective head (H) is taken as a vertical axis. In other words, a system loss curve in which the vertical axis represents the pressure difference between the upstream and downstream sides of the water turbine (W) and the horizontal axis represents the total flow rate (QT), may be used.

Moreover, the operating point of the generator (G) may be determined, on the characteristic map (M), through a combination of the rotational speed (N) and the generated power (P), or a combination of the torque value (T) and the generated power (P). That is to say, the characteristics of the generator (G) used in the characteristic map (M) may suitably be a characteristic of the generator (G) that correlates with the flow rate (Q1) of the water turbine (W) and the effective head (H), and that can be detected.

The water turbine (W) and the generator (G) forming the hydroelectric power generation system (10) are not limited to any particular type as long as the characteristics of the generator (G) (which can be detected) can be associated with the flow rate (Q1) of the water turbine (W) and the effective head (H) of the water turbine (W). For example, even if the operation of the water turbine (W) cannot be varied by the generator (G), it is possible to estimate the flow rate (Q1) and the effective head (H) as in this embodiment.

Advantages of Embodiment

Application of the technique of estimating the total flow rate (QT) described in this embodiment to the hydroelectric power generation system (10) of the first embodiment, the variation of the first embodiment, or the second embodiment makes it possible to know the flow rate (Q1) of the water turbine (W) and the flow rate (Q1) of the second branch pipe (13) without using the first flowmeter (17) or the second flowmeter (18). In other words, this embodiment enables control without using the first flowmeter (17) and the second flowmeter (18), and thus, omission of the first flowmeter (17) and the second flowmeter (18). That is, in this embodiment, the costs for the hydroelectric power generation system (10) can be reduced.

Fourth Embodiment

In a fourth embodiment of the present invention, an example of the hydroelectric power generation system (10) is described. This example is capable of controlling the electric power to be flowed reversely, while maintaining the pressure of the fluid supplied through the pipe (1) (i.e., the physical quantity of the fluid, referred to as the supplied pressure) at a desired value (target pressure (P*)). The hydroelectric power generation system (10) of this embodiment is arranged as an alternative device of, for example, a decompression valve provided in the waterworks (4), so that the energy of the fluid that has not been used can be recovered as electric power.

Figure 8:
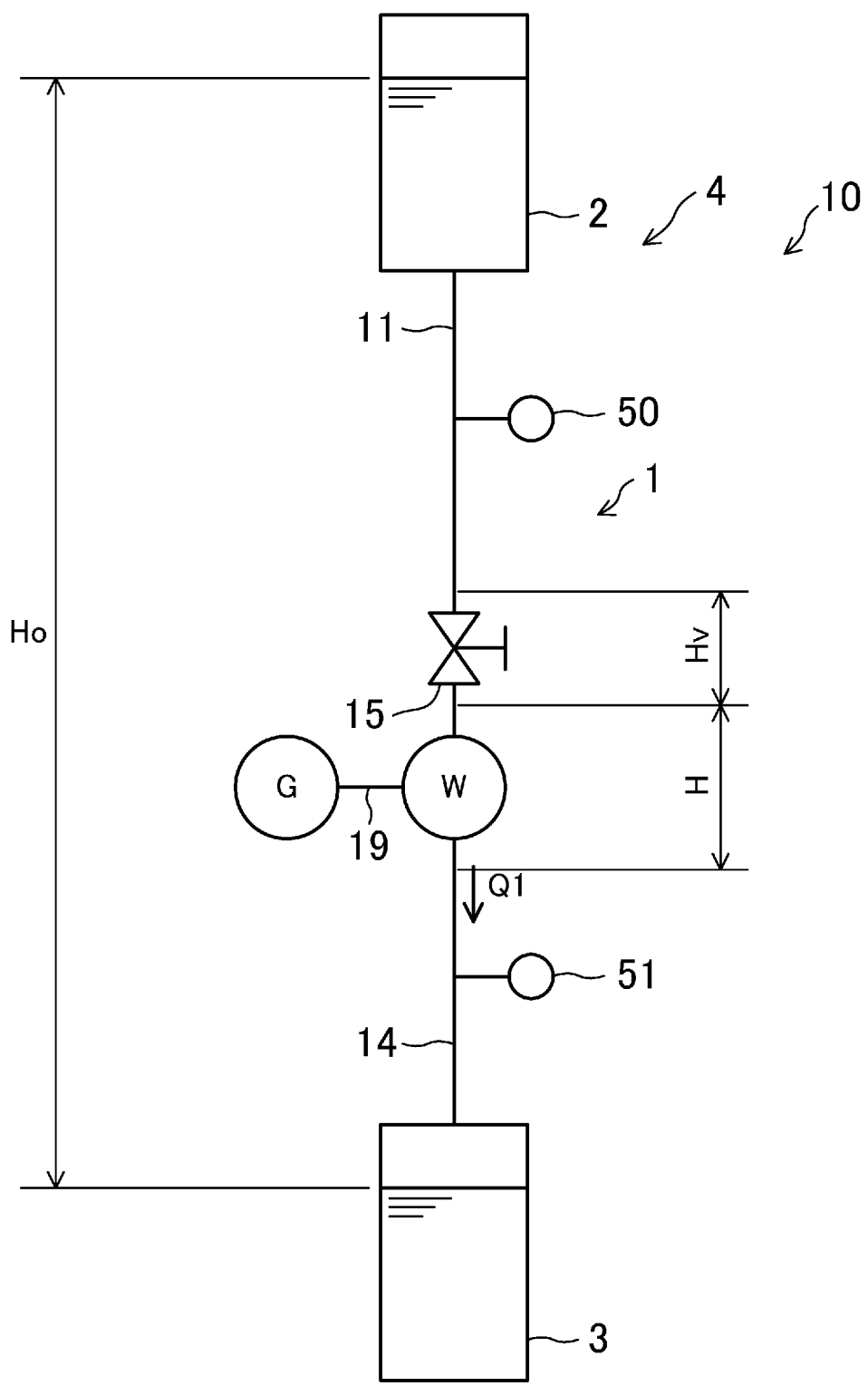
FIG. 8 schematically illustrates an overall configuration of a pipe including a hydroelectric power generation system according to a fourth embodiment.

FIG. 8 schematically illustrates the overall configuration of the pipe (1) including the hydroelectric power generation system (10) according to the fourth embodiment of the present invention. As illustrated in FIG. 8, the pipe (1) of this embodiment is connected to an inflow pipe (11) and an outflow pipe (14). The inflow pipe (11) has an inflow end connected to the storage tank (2). The outflow pipe (14) has an outflow end connected to the water receiving tank (3).

An inlet-side pressure gauge (50), a first motor-operated valve (15), and the water turbine (W) (specifically, the fluid inlet of the water turbine (W)) are connected to the inflow pipe (11) in this order in the flow direction. In other words, the first motor-operated valve (15) is connected in series to the water turbine (W). An outflow pipe (14) is connected to the fluid outlet of the water turbine (W). An outlet-side pressure gauge (51) is connected to an intermediate portion of the outflow pipe (14). The inlet-side pressure gauge (50) detects a pressure (P1) of a fluid to be supplied to the water turbine (W), and the outlet-side pressure gauge (51) detects a pressure (P2) of flowing out of the water turbine (W). The value detected by the outlet-side pressure gauge (51) corresponds to the supplied pressure. The detected value of the outlet-side pressure gauge (51) (supplied pressure=pressure (P2)) is an example of the "fluid information including information correlated with the physical quantity of the fluid flowing out of a channel" of the present invention. The outlet-side pressure gauge (51) is an example of the fluid information acquisition unit of the present invention.

The first motor-operated valve (15) controls a flow rate of a fluid by driving the valve body with an electric motor. The degree of opening of the first motor-operated valve (15) is controlled by a generator controller (20), which will be described later. Thus, the flow rate of the fluid flowing into the water turbine (W) is controlled. That is, the first motor-operated valve (15) is an example of the flow rate control valve of the present invention.

Figure 9:
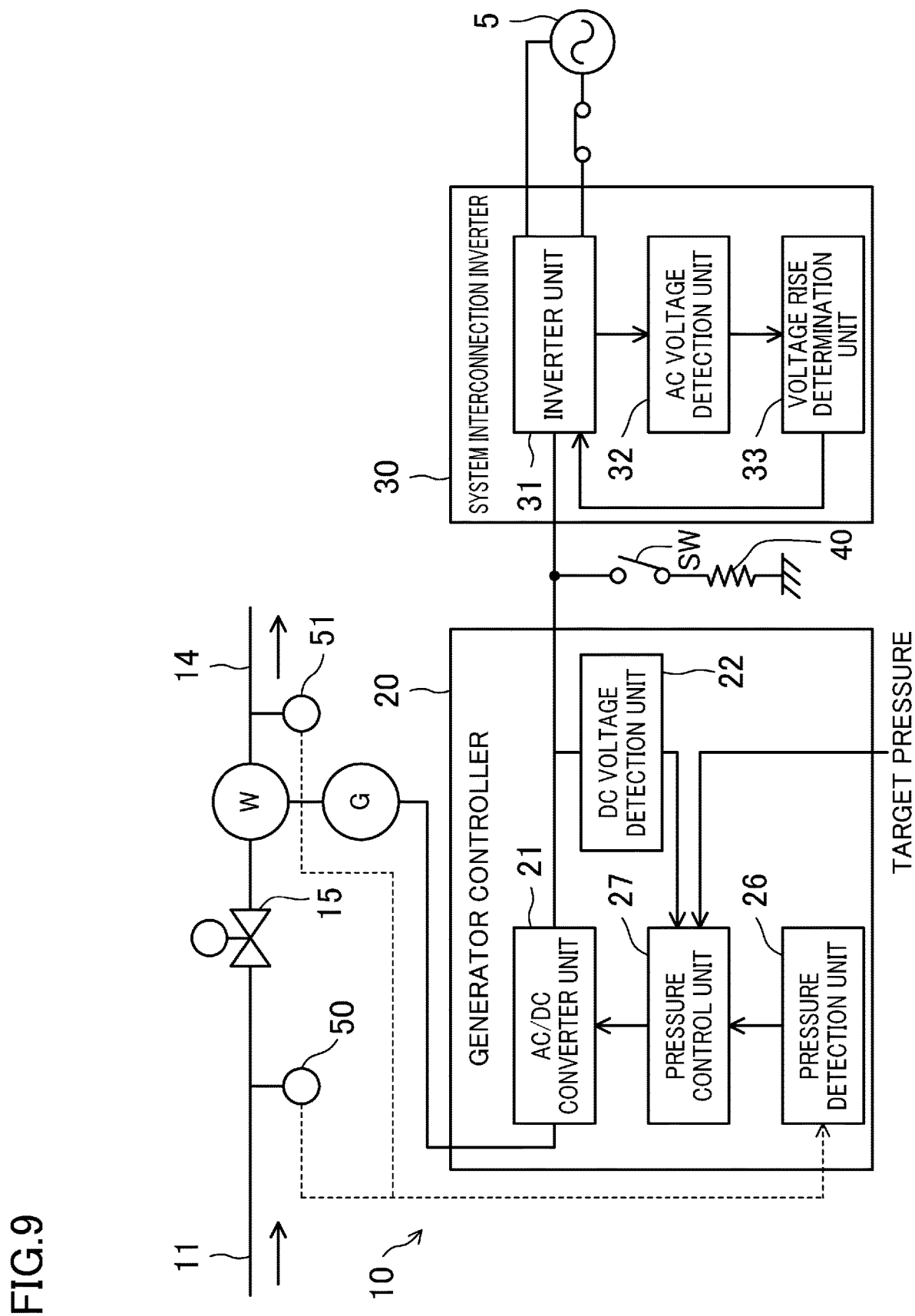
FIG. 9 is a diagram illustrating an electric power system of the hydroelectric power generation system of the fourth embodiment.

FIG. 9 is a diagram illustrating an electric power system of the hydroelectric power generation system (10) according to the fourth embodiment. As illustrated in FIG. 9, the hydroelectric power generation system (10) includes a generator controller (20) and a system interconnection inverter (30). The configuration of the system interconnection inverter (30) is the same as that of the first embodiment, whereas the configuration of the generator controller (20) differs from that of the first embodiment. Specifically, the generator controller (20) of this embodiment includes a pressure detector (26) instead of the flow rate detection unit (23) of the first embodiment, and a pressure controller (27) instead of the flow rate control unit (25).

The pressure detector (26) reads the detection values of the inlet-side pressure gauge (50) and the outlet-side pressure gauge (51), and transmits the detected values to the pressure controller (27) periodically or in response to a request from the pressure controller (27). The pressure controller (27) cooperatively controls the degree of opening of the first motor-operated valve (15) and the switching of an AC/DC converter unit (21), as will be described later, so as to control the electric power to be flowed reversely while maintaining the supplied pressure at a desired value.

Also in this embodiment, when the AC voltage value (Vac) of the distribution line of the electric power system (5) is likely to exceed the upper limit of the voltage regulation range (Vr), the hydroelectric power generation system (10) performs the reducing operation of at least one of electric power generated or electric power to be generated for reducing electric power to be supplied to the electric power system (5). Specifically, also in this embodiment, when the AC voltage value (Vac) detected by the AC voltage detection unit (32) of the system interconnection inverter (30) exceeds a predetermined first threshold (Th1), the electric power to be supplied to the electric power system (5) is reduced by the system interconnection inverter (30). Then, when the DC voltage (Vdc) exceeds the predetermined second threshold (Th2) due to the reduction of electric power caused by the system interconnection inverter (30), the generator controller (20) also performs the reducing operation of at least one of electric power generated or electric power to be generated. In order to determine whether the reducing operation of at least one of electric power generated or electric power to be generated is necessary, a detection value of the DC voltage detection unit (22) is transmitted to the pressure controller (27).

<Electric Power (AC Voltage) and Flow Rate Control>
—Concept of Pressure Control—

Figure 10:
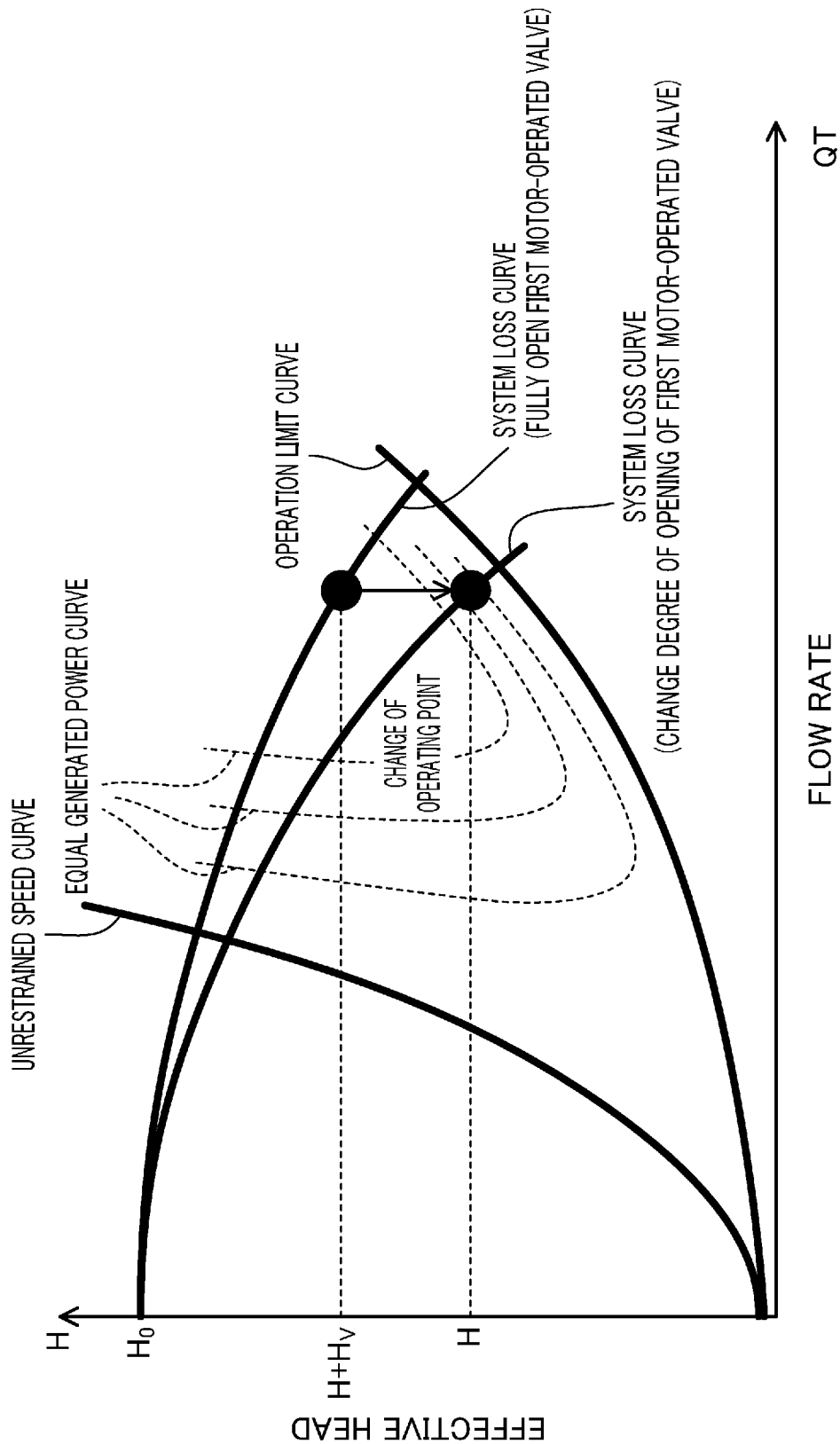
FIG. 10 shows a characteristic map for explaining the concept of control in the fourth embodiment.

FIG. 10 shows a characteristic map (M) for explaining the concept of control in this embodiment. In the hydroelectric power generation system (10), if the sum of an effective head (H) in the water turbine (W) and an effective head (Hv) in the first motor-operated valve (15) is controlled so as to be a constant value when the electric power is reduced, it is possible to control the electric power to be flowed reversely while maintaining the supplied pressure at a desired value. Referring to FIG. 10, it can be seen that the operating point of the water turbine (W) has only to be shifted directly below the current location.

However, as described earlier, the system loss curve (S) is curve like a quadratic curve, and in the case of the pipe (1) of this embodiment, the operating point of the water turbine (W) moves on the system loss curve (S). It is therefore impossible to make the sum of the effective head (H) in the water turbine (W) and the effective head (Hv) in the first motor-operated valve (15) be a constant value merely by controlling the switching of the AC/DC converter unit (21). In view of this, in this embodiment, the degree of opening of the first motor-operated valve (15) is also controlled, thereby causing the system loss curve (S) itself to change as shown in FIG. 10. In other words, in this embodiment, the operating point is shifted directly downward from the current location through cooperative control of the degree of opening of the first motor-operated valve (15) and the switching of the AC/DC converter unit (21).

Specifically, in this embodiment, the pressure controller (27) monitors the detected value of the outlet-side pressure gauge (51) (i.e., the output from the pressure detector (26)). At the same time, the pressure controller (27) controls the output power of the AC/DC converter unit (21) while adjusting the degree of opening of the first motor-operated valve (15) so that the detected value becomes equal to (or approaches) the target pressure (P*) (cooperative control). Here, the pressure controller (27) can use feed back control when adjusting the degree of opening of the first motor-operated valve (15) and controlling the output power of the AC/DC converter unit (21).

Note that the effective head (H) in the water turbine (W) can be obtained, for example, by using the characteristic map (M) described above. When the sum of the effective head (H) of the water turbine (W) and the effective head (Hv) of the first motor-operated valve (15) is set to a constant value, a target value of the effective head (Hv) of the first motor-operated valve (15) can be determined when the effective head (H) of the water turbine (W) is determined. Then, since the effective head (Hv) of the first motor-operated valve (15) and the degree of opening of the first motor-operated valve (15) have a correspond relationship expressed as 1:1, it is possible to determine the degree of opening of the first motor-operated valve (15) when the target value of the effective head (Hv) is determined.

—Control Operation—

Also in the hydroelectric power generation system (10), the voltage rise determination unit (33) monitors the detected value of the AC voltage detection unit (32). When the AC voltage value (Vac) exceeds the first threshold (Th1), the system interconnection inverter (30) performs the reducing operation of at least one of electric power generated or electric power to be generated. On the other hand, the pressure controller (27) monitors the detected value of the DC voltage detection unit (22). For example, when the detected value of the DC voltage detection unit (22) exceeds a predetermined second threshold (Th2) due to the reducing operation of at least one of electric power generated or electric power to be generated performed by the system interconnection inverter (30), the generator controller (20) performs the reducing operation of at least one of electric power generated or electric power to be generated.

In the reducing operation of at least one of electric power generated or electric power to be generated by the generator controller (20), the pressure controller (27) reduces the effective head (14) of the water turbine (W) to reduce the generated power. A change in the effective head (H) of the water turbine (W) changes the sum of the effective head (H) of the water turbine (W) and the effective head (Hv) of the first motor-operated valve (15). Therefore, the pressure controller (27) changes the target value of the effective head (Hv) of the first motor-operated valve (15). Specifically, the pressure controller (27) adjusts the degree of opening of the first motor-operated valve (15) while monitoring the detected value of the outlet-side pressure gauge (51) (the output of the pressure detector (26)), so that the detected value becomes equal to the target pressure (P*). As a result, the supplied pressure is maintained at a predetermined target pressure (P*) in the pipe (1).

Also in this embodiment, the regenerative resistor (40) is allowed to consume the electric power when the reducing operation of at least one of electric power generated or electric power to be generated is performed. The timing at which the switch (SW) connected to the regenerative resistor (40) is turned on may be set to be a moment when the system interconnection inverter (30) reduces the electric power as in the first embodiment, or a moment when the generator controller (20) reduces the electric power as in the variation of the first embodiment.

Advantages of Embodiment

As described above, the hydroelectric power generation system (10) of this embodiment makes it possible to control the electric power (the voltage in the distribution line) while maintaining the physical quantity of fluid (the supplied pressure in this case) at a desired value (the target pressure (P*)).

Also in this embodiment, the generator controller (20) and the system interconnection inverter (30) may be configured so as to detect the AC voltage value (Vac) in the generator controller (20) and to control the electric power, as in the second embodiment. This configuration makes it possible to omit the regenerative resistor (40).

Other Embodiments

The hydroelectric power generation system (10) can be installed not only in the pipe (1), but also in an open channel or a channel including a close channel (e.g., a pipe) and an open channel. As an example, it is conceivable to install the hydroelectric power generation system (10) in an agricultural irrigation canal.

The fluid supplied to the water turbine (W) is not limited to water. For example, brine which is used in an air conditioner installed in, e.g., a building may be used as the fluid.

The flow rate and the pressure have been described as non-limiting examples of the physical quantity of the fluid.

The location where the hydroelectric power generation system (10) is installed is not limited to the waterworks (4).

The configuration of any one of the first embodiment, the variation of the first embodiment, the second embodiment, and the third embodiment (i.e., the configuration in which the total flow rate is controlled to a constant value) may be combined with the configuration of the fourth embodiment (i.e., the configuration in which the supplied pressure is controlled to a constant value).

The magnitude of the electric power system to be supplied to the electric power system (5) (i.e., the electric power to be sold) may be determined from various viewpoints. For example, when the total amount of "generated power" is to be sold (i.e., when all the generated power is supplied to the electric power system), "generated power" is controlled so that the following expression will hold: "electric power supplied to the electric power system (5)"="generated power to be generated"<"electric power acceptable to the electric power system (5)".

On the other hand, when part of the generated power is spent on self consumption (hereinafter, the electric power spent on self consumption is referred to as "self power consumption"), and a surplus of the generated power (hereinafter referred to as the "surplus power") is supplied to the electric power system (5), the following expression holds: "surplus power"="generated power"−"self power consumption". In this case, the "generated power" is controlled so that the following expression will hold: "electric power supplied to the electric power system (5)"="surplus power"<"electric power acceptable to the electric power system (5)". In this case, the information for identifying the "self power consumption" may be obtained by, for example, actually measuring the consumption, estimating the consumption based on the past demand data, or using the maximum self power consumption estimated in advance. If the "generated power" is spent on self consumption, an electric equipment which increases power consumption in response to a request may be used as the "power consumption unit," in addition to the regenerative resistor (40).

When controlling the physical quantity of the fluid (e.g., the total flow rate (QT) of the pipe (1)) to a "desired value", the "desired value" may be a single value (a single constant value) or a value which may be in a range of a value equal to or less than a predetermined threshold, or a value equal to or greater than a predetermined threshold, or in a predetermined range of values.

Examples usable as the "power supply-and-demand information" include, in addition to the voltage value (AC voltage value (Vac)) of the distribution line of the electric power system (5), a voltage frequency of the distribution line of the electric power system (5), a voltage phase of the distribution line of the electric power system (5), a power factor of the distribution line of the electric power system (5), electric power, a request from a power company to reduce electric power to be flowed reversely, the power generation upper limit determined by the contract with the electric power company.

INDUSTRIAL APPLICABILITY

The present invention is useful as a hydroelectric power generation system.

DESCRIPTION OF REFERENCE CHARACTERS

1 Pipe (Channel)
5 Commercial Power Supply (Electric Power System)
10 Hydroelectric Power Generation System
13 Second Branch Pipe (Bypass Channel)
15 First Motor-Operated Valve (Flow Rate Control Valve)
17 First Flowmeter (Fluid Information Acquisition Unit)
18 Second Flowmeter (Fluid Information Acquisition Unit)
20 Generator Controller (Control Unit)
30 System Interconnection Inverter (Control Unit)
32 AC Voltage Detection Unit (Electric Power Information Acquisition Unit)
40 Regenerative Resistor (Power Consumption Unit)
G Generator
W Water Turbine (Fluid Machine)

The invention claimed is:

1. A hydroelectric power generation system comprising:
a fluid machine arranged in a channel through which a fluid flows;
a generator driven by the fluid machine;
a controller configured to control at least one of electric power generated or electric power to be generated by the generator and to supply electric power generated by the generator to an electric power system;
an electric power information acquisition unit configured to acquire power supply-and-demand information, the power supply-and-demand information including electric power acceptable to an electric power system or information correlated with the electric power;
a fluid information acquisition unit configured to acquire fluid information including information correlated with a physical quantity of the fluid flowing out of the channel,
wherein the controller controls at least one of the physical quantity, the channel, an electric power generated or an electric power to be generated by the generator by using the fluid information so that the physical quantity becomes equal to a desired value, while controlling electric power to be supplied to the electric power system to the electric power acceptable to the electric power system or less based on the acquired power supply-and-demand information,
wherein the controller estimates a flow rate and an effective head in the fluid machine based on a detectable characteristic that is related to the generator and correlated with the flow rate and the effective head in the fluid machine, and estimates the total flow rate based on a flow resistance characteristic line representing a relation between the effective head and the total flow rate in the channel, the flow rate which has been estimated, and the effective head which has been estimated.

2. The hydroelectric power generation system of claim 1, wherein
the channel is provided with a bypass channel bypassing the fluid machine,
the physical quantity includes a total flow rate of the fluid in the channel, and
the controller controls a flow rate of the fluid in the bypass channel so as to cause the total flow rate to approach a predetermined target total flow rate.

3. The hydroelectric power generation system of claim 1, wherein
the channel is a pipe, and is provided with a flow rate control valve connected in series to the fluid machine and controlling a flow rate of the fluid flowing into the fluid machine,
a value of the physical quantity includes a pressure of the fluid flowing out of the channel, and
the controller controls a degree of opening of the flow rate control valve so as to cause the pressure to approach a predetermined target pressure.

4. The hydroelectric power generation system of claim 1, wherein the controller acquires the power supply-and-demand information based on a voltage value of a distribution line of the electric power system.

5. The hydroelectric power generation system of claim 1, further comprising:
a power consumption unit configured to consume the generated electric power, wherein
the controller supplies part or all of the generated electric power to the power consumption unit so that the electric power to be supplied to the electric power system becomes equal to a desired value.

6. The hydroelectric power generation system of claim 1, wherein the controller controls a flow rate in the fluid machine so that the electric power to be supplied to the electric power system becomes equal to a desired value.

7. The hydroelectric power generation system of claim 3, wherein the controller controls the at least one of electric power generated or electric power to be generated while controlling the degree of opening of the flow rate control valve so that the electric power to be supplied to the electric power system becomes equal to a desired value.

8. The hydroelectric power generation system of claim 2, wherein the controller estimates a flow rate and an effective head in the fluid machine based on a detectable characteristic that is related to the generator and correlated with the flow rate and the effective head in the fluid machine, and estimates the total flow rate based on a flow resistance characteristic line representing a relation between the effective head and the total flow rate in the channel, the flow rate which has been estimated, and the effective head which has been estimated.

9. The hydroelectric power generation system of claim 4, further comprising:
a power consumption unit configured to consume the generated electric power, wherein
the controller supplies part or all of the generated electric power to the power consumption unit so that the electric power to be supplied to the electric power system becomes equal to a desired value.

10. The hydroelectric power generation system of claim 4, wherein the controller controls a flow rate in the fluid machine so that the electric power to be supplied to the electric power system becomes equal to a desired value.

* * * * *